United States Patent
Houston (10) Patent No.: US 7,571,037 B2
(45) Date of Patent: Aug. 4, 2009

(54) USER-RELOCATABLE SELF-DEFINING BUTTONS TO CONTROL MACHINERY

(75) Inventor: John S. Houston, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 11/314,622

(22) Filed: Dec. 21, 2005

(65) Prior Publication Data
US 2007/0143689 A1 Jun. 21, 2007

(51) Int. Cl.
*H01H 9/26* (2006.01)
*G06F 17/00* (2006.01)

(52) U.S. Cl. ............... 701/36; 701/1; 701/2; 345/156; 362/23

(58) Field of Classification Search .............. 701/36, 701/1, 2, 41; 200/5 R, 4, 14; 345/156, 157, 345/161, 184, 163, 169; 362/23, 29, 85; 307/10.1
See application file for complete search history.

(56) References Cited

U.S. PATENT DOCUMENTS

| | | | | |
|---|---|---|---|---|
| 4,792,783 | A * | 12/1988 | Burgess et al. | 307/10.1 |
| 5,949,149 | A * | 9/1999 | Shitanaka et al. | 307/10.1 |
| 6,240,347 | B1 * | 5/2001 | Everhart et al. | 701/36 |
| 6,349,616 | B1 * | 2/2002 | Onodera et al. | 74/552 |
| 6,424,337 | B1 * | 7/2002 | Eriksson et al. | 345/163 |
| 6,891,528 | B2 | 5/2005 | Houston | |
| 7,112,894 | B2 * | 9/2006 | McCullough et al. | 307/10.1 |
| 2002/0085037 | A1 | 7/2002 | Leavitt et al. | |
| 2003/0132094 | A1 | 7/2003 | Mickle et al. | |
| 2003/0164282 | A1 | 9/2003 | Enright | |
| 2004/0021704 | A1 | 2/2004 | Mitsutake | |
| 2004/0117084 | A1 * | 6/2004 | Mercier et al. | 701/36 |
| 2005/0146447 | A1 | 7/2005 | Na | |

FOREIGN PATENT DOCUMENTS

JP 2001-344639 12/2001

OTHER PUBLICATIONS

Wireless Remote Dimmers and Switches, Switches & Remotes.
Control Pull-Chain Lights with a Wireless Switch!, Wireless Light Socket Switch HW2165D.
Gold Slimline Decorator Switch.

* cited by examiner

*Primary Examiner*—Tan Q Nguyen
(74) *Attorney, Agent, or Firm*—Lawrence D. Cutter; Jose Gutman; Fleit, Gibbons, Gutman, Bongini & Bianco P.L.

(57) ABSTRACT

A method and system associate a user control in a user interface with a function of a controllable device by physically locating a self-defining user control which includes identification information at a first predefined location in a user interface, determining the identification information from the self-defining user control by a controller via a first interconnect, and the controller associating the self-defining user control with a predefined function for a controllable device. The method further detects a user input signal via the self-defining user control at the first predefined location; and activates the predefined function for the controllable device. The self-defining user control is one of a button, switch, knob, or any combination thereof, and is locatable at one of a plurality of predefined locations in the user interface.

18 Claims, 9 Drawing Sheets

USER-RELOCATABLE SELF-DEFINING BUTTONS TO CONTROL MACHINERY

BACKGROUND OF THE INVENTION

1. Field of the Invention

This invention generally relates to the field of man-machine interfaces and instrument control, and more particularly relates to a system and method of using self-defining buttons that are user locatable to control a machine or device for greater physical accessibility and variation for a user.

2. Description of Related Art

People with physical disabilities may be constrained in their use of a variety of equipment, such as motor vehicles, simply by the physical location of the control switches or buttons. The design of most equipment today is primarily centered upon the average or typical physical attributes of the general population (or "average" person). In this manner, manufacturers attempt to attain the most desirability for their products by appealing to the greatest segment of the population. The result is that the needs of persons who do not match typical physical norms, such as the physically disabled or exceedingly short or tall people, are generally ignored or disregarded.

For example, in motor vehicles, a large percentage of the controls are physically located in the center panel of the dashboard. For the average person, this arrangement is fairly easily accessible and convenient. However, for a person having limited mobility or range of motion, such as in the right arm, reaching some of the controls may be difficult or impossible while seated or properly located in the vehicle. This person, who is otherwise perfectly capable of driving the vehicle except for the location of the controls, is prevented from having the independence and freedom associated with driving a motor vehicle simply because of the physical location of its controls (i.e. buttons, switches or other input devices). To overcome this problem, the driver is left with the only option of having the vehicle custom altered to meet the user's needs. If the required alterations are even possible, the cost of doing such customization is usually very expensive.

However, many of the buttons and switches on equipment that control various functions are consistent in size and form, yet the function of each button and switch is defined by its physical location on the equipment. Each button may have a different level of importance to an individual user. But, the standard arrangement of buttons and switches typically does not vary. In some instances, a button that is conveniently located for one user may receive minimal use. Likewise, there can be instances where a control (e.g., a button or a switch or other user input device) that was designed with the intentions of minimal use actually is extremely important to a specific user.

Therefore a need exists to overcome the problems with the prior art as discussed above.

SUMMARY OF THE INVENTION

According to a preferred embodiment of the present invention, a method and system for associating a user control in a user interface with a function of a controllable device disclosed. The method includes receiving a self-defining user control at a first predefined location in a user interface. The self-defining user control includes identification information that is readable by a controller for a controllable device. Identification information is determined by the controller from the self-defining user control at the first predefined location. In response to determining the identification information, the controller associates the self-defining user control at the first predefined location with a predefined function for the controllable device.

In another embodiment, a system for associating a user control in a user interface with a function of a controllable device disclosed. The system includes a self-defining user control physically located at a first predefined location in a user interface. A first interconnect, communicatively coupled with the self-defining user control at the first predefined location is also included. The system further includes a controller that is communicatively coupled with the first interconnect and the self-defining user control at the first pre-defined location. The controller determines an identification information from the self-defining user control, and, in response thereto, the controller associates the self-defining user control at the first predefined location with a predefined function for a controllable device.

The system further includes, in one embodiment, a plurality of interconnects, each interconnect at a plurality of separate predefined locations in a user interface, each interconnect of the plurality of interconnects is communicatively coupled with the controller, and the self-defining user control is locatable at any one of the plurality of predefined locations. Each interconnect in the plurality of interconnects is coupled with the controller via one of star electrical network arrangement, a circular (or ring) electrical network arrangement, or a bus electrical network arrangement.

In yet another embodiment, a self-defining user control is disclosed. The self-defining user control includes an electrical interconnect and an electrical circuit. The electrical circuit provides identification information via the electrical interconnect to a controller determining the identification information from the self-defining user control. The identification information associates the self-defining user control with a predefined function for a controllable device.

The self-defining user control, in one embodiment, includes an electrical interconnect and an electrical circuit for providing an identification information via the electrical interconnect to a controller reading the identification information from the self-defining user control, the identification information associating the self-defining user control with a predefined function for a controllable device. The self-defining user control also has a modular mechanical interconnect for mechanically locating the self-defining user control in any one of a plurality of pre-defined locations in a user interface. The electrical interconnect mechanically mates with a separate electrical interconnect located at the any one of the plurality of pre-defined locations in the user interface and the controller is capable of reading the identification information from the self-defining user control via the electrical interconnect mechanically mated with the separate electrical interconnect located at the any one of the plurality of pre-defined locations in the user interface. Thereby, the controller is capable of reading the identification information for associating the self-defining user control with a predefined function for a controllable device.

BRIEF DESCRIPTION OF THE DRAWINGS

In the accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DESCRIPTION OF THE PREFERRED EMBODIMENTS

Terminology Overview

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an," as used herein, are defined as "one or more than one." The term "plurality," as used herein, is defined as "two or more than two." The term "another," as used herein, is defined as "at least a second or more." The terms "including" and/or "having," as used herein, are defined as "comprising" (i.e., open language). The term "coupled," as used herein, is defined as "connected, although not necessarily directly, and not necessarily mechanically." The terms "controls," "button," "knob," and "switch" are used interchangeably to indicate a mechanical means for a user to control functions of a piece of equipment, instrument or device. The terms "program," "software application," and the like as used herein, are defined as "a sequence of instructions designed for execution on a computer system." A program, computer program, or software application typically includes a subroutine, a function, a procedure, an object method, an object implementation, an executable application, an applet, a servlet, a source code, an object code, a shared library/dynamic load library and/or other sequence of instructions designed for execution on a computer system.

Overview

The present invention, according to one embodiment, overcomes problems with the prior art by taking advantage of the consistency in the size and shape of switches, buttons, and user controls on equipment, instruments, and devices, and the increasing use of electronics to manage the controls to provide self-defining and user-locatable controls for the equipment, instruments, and devices. The entire teachings of U.S. Pat. No. 6,891,528, "Interchangeable Keyboard with Self Defining Keys," filed Apr. 24, 2001, are hereby incorporated by reference. Enabling the controls of a piece of equipment to be self-defining, regardless of physical location, would allow any user, but most significantly the disabled, to reconfigure and/or relocate the controls to place the items most important to his or her particular needs in a new location more convenient or desirable for personal use by the particular user.

In an embodiment of the present invention, each button, switch, or other control used to control a function of a piece of equipment, instrumentation or device contains its own unique self-defining id mapped to its function. Each such button or switch is designed to be interchangeable with other buttons or switches in an embodiment of the present invention. When an individual wishes to rearrange the controls for his/her equipment, for example, he/she needs only to physically move the button, switch, or control to a new location which is more convenient for his/her use.

Figure 1:
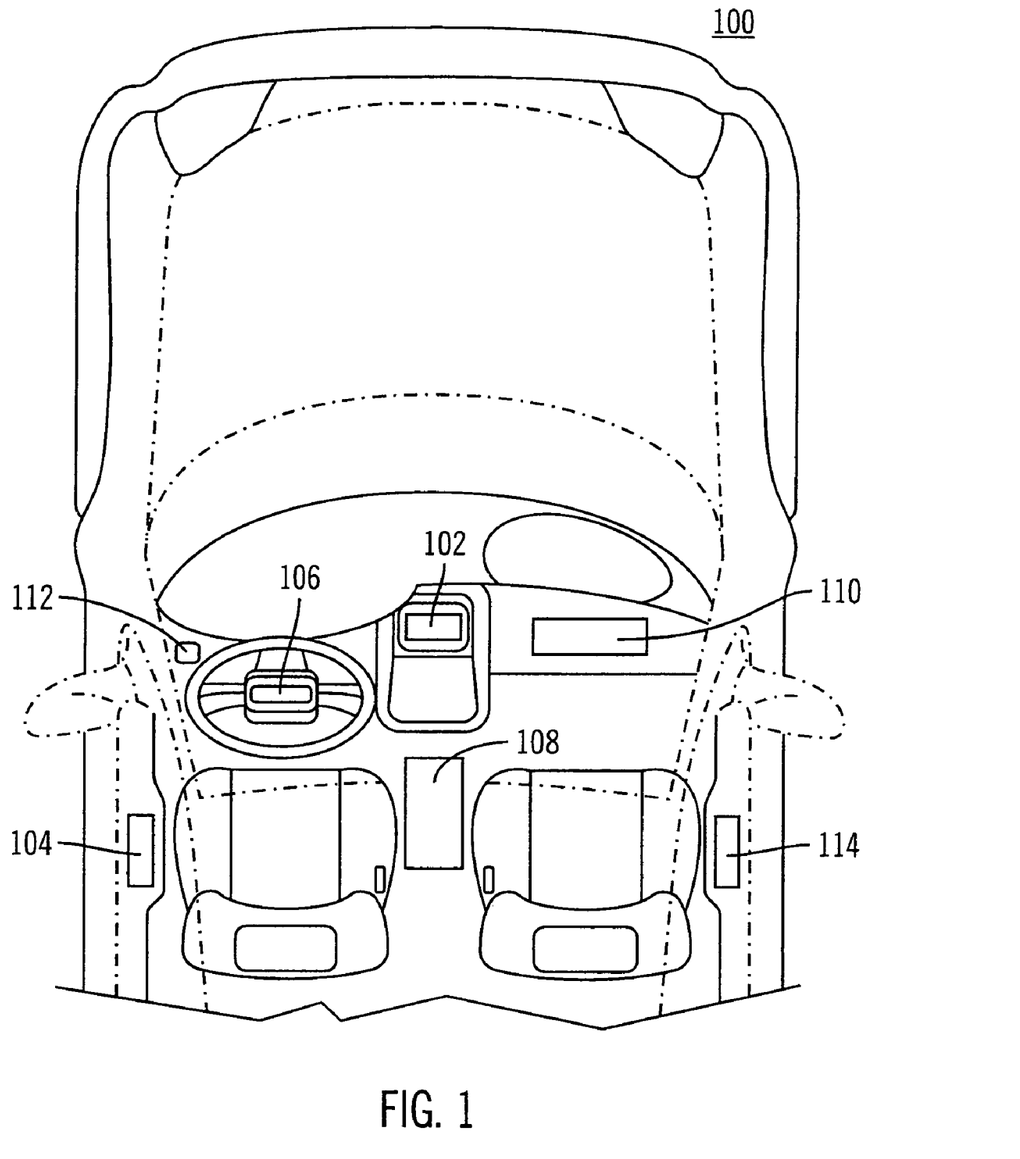
FIG. 1 is a block diagram illustrating an automobile having multiple locations for banks of user movable self-defining controls in accordance with an exemplary embodiment of the present invention.

As an example, in most automobiles 100 today, such as the one depicted in FIG. 1, there are numerous locations for controls. Typically, control panels are located in such positions as the center dashboard 102, the driver-side door 104, the steering wheel 106, a floor console 108, the passenger-side dashboard 110, the driver-side dashboard 112, the passenger-side door 114, and even ceiling mounted consoles (not shown in FIG. 1). Current automobiles generally hardwire a specified control feature to the specific location of the particular control, button, or switch. For example, a knob for turning on the windshield wipers, located on the driver-side dashboard 112, is connected to a wire that extends back to the actual windshield wiper motor or to the automobile's central processor. When the knob is turned, a signal is sent over that wire, which is dedicated to windshield wiper control, and the wipers are activated or deactivated. The intended action is carried out because the knob at a stationary location, connected to a specified wire, has been engaged.

Figure 2:
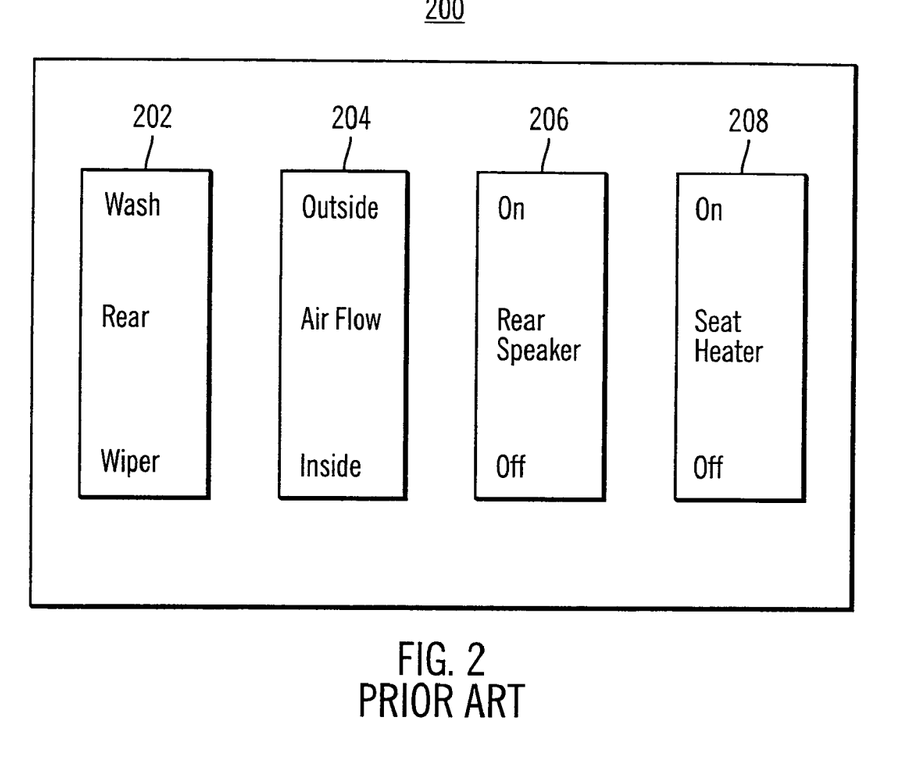
FIG. 2 is an exemplary illustration of a bank of prior art rocker switches located in an automobile.
Figure 3:
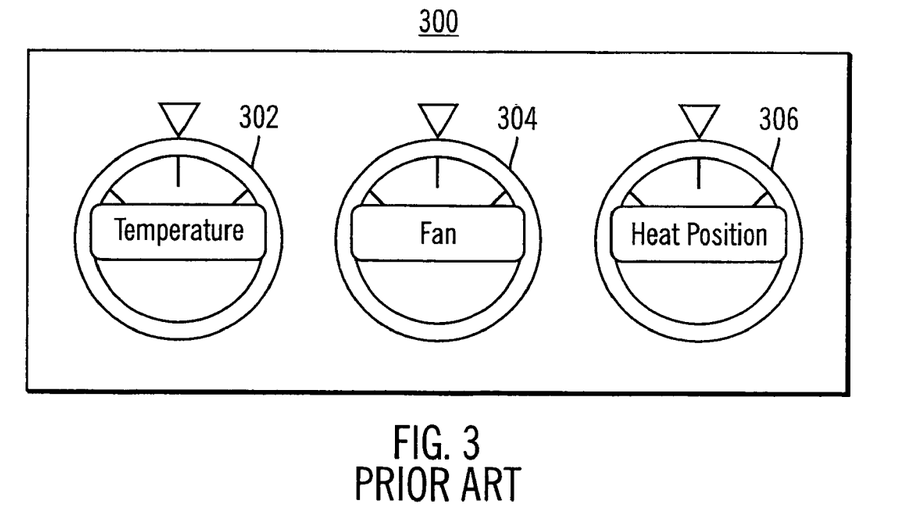
FIG. 3 is an exemplary illustration of a bank of prior art knob switches located in an automobile.

Often, the control devices (e.g., buttons, switches, or knobs) are all very similar in appearance, with the only physical differences between the individual controls being the printed symbols or words on the control and the actual physical location. In one example, as shown in FIG. 2, there can be a row of physical rocker switches 200 to control various functions such as the rear windshield wipers 202, the source of air flow 204, the rear speakers 206, and the driver's seat heater 208. In another example, as shown in FIG. 3, the controls for the heating system are simple knobs or dials that the driver or passenger turns to set the temperature 302, fan speed 304, and heat position 306. Multiple knobs are located, for example, in a row across the center dashboard 102. These knobs are very simple plastic molds that, according to an embodiment of the present invention, could easily be moved from one location to another, or even replaced with a different style of knob or buttons. Encoding the knob with the id of the function for which the knob is intended to perform, in accordance with an embodiment of the present invention, would allow the individual to re-organize these controls to be in positions more suitable for his/her individual needs.

Figure 4:
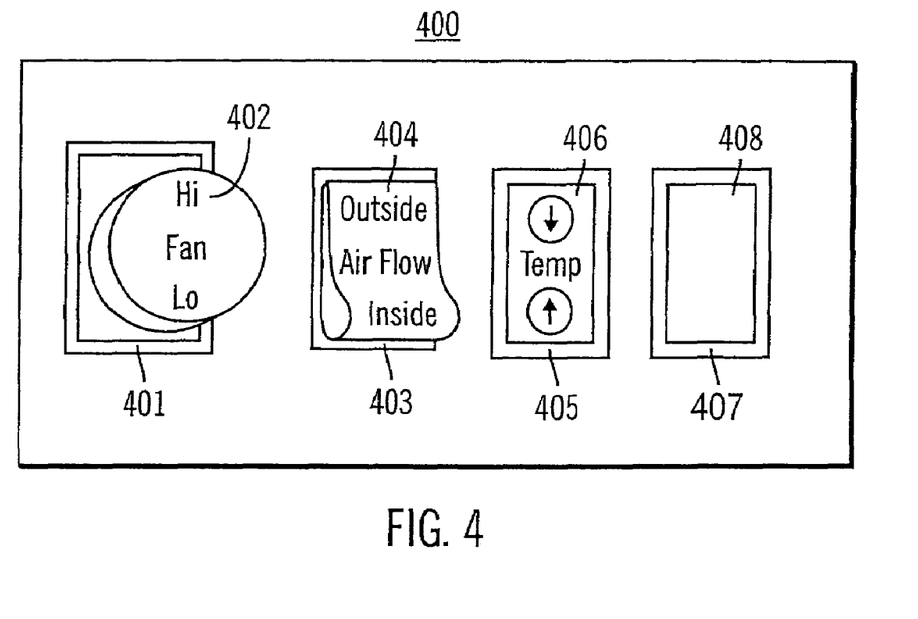
FIG. 4 is a block diagram illustrating an exemplary bank of controls including self-defining controls in accordance with an embodiment of the present invention.

An embodiment of the present invention, as shown in FIG. 4, contains a control panel 400 that allows for the implementation of a variety of control options. The panel contains a number of control positions 401, 403, 405, and 407 in which different switches may be mounted. For example, a knob 402 to control the fan speed is located at the first position 401. A rocker switch 404 for determining the source of air flow is located in the second position 403. A set of push buttons 406 to control the temperature is located in the third position 405. Finally, the fourth position 407 in this example is unused and covered by a blank cap 408. For example, the knob 402 to control the fan could be removed from position 401 and placed in position 407 and the blank cap 408 could be relocated to the first position 401.

Figure 5:
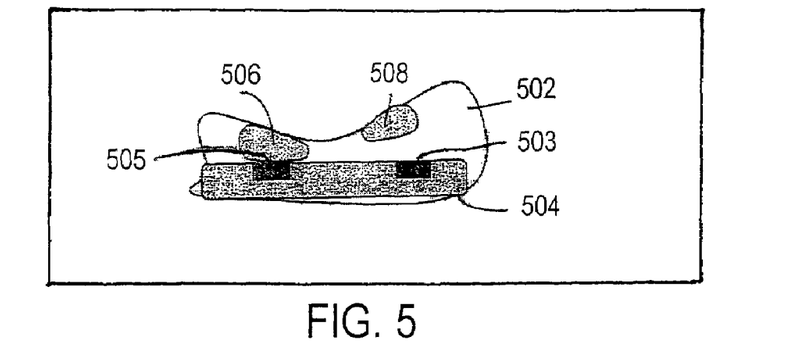
FIG. 5 is a more detailed diagram of an exemplary self-defining switch in accordance with an embodiment of the present invention.
Figure 6:
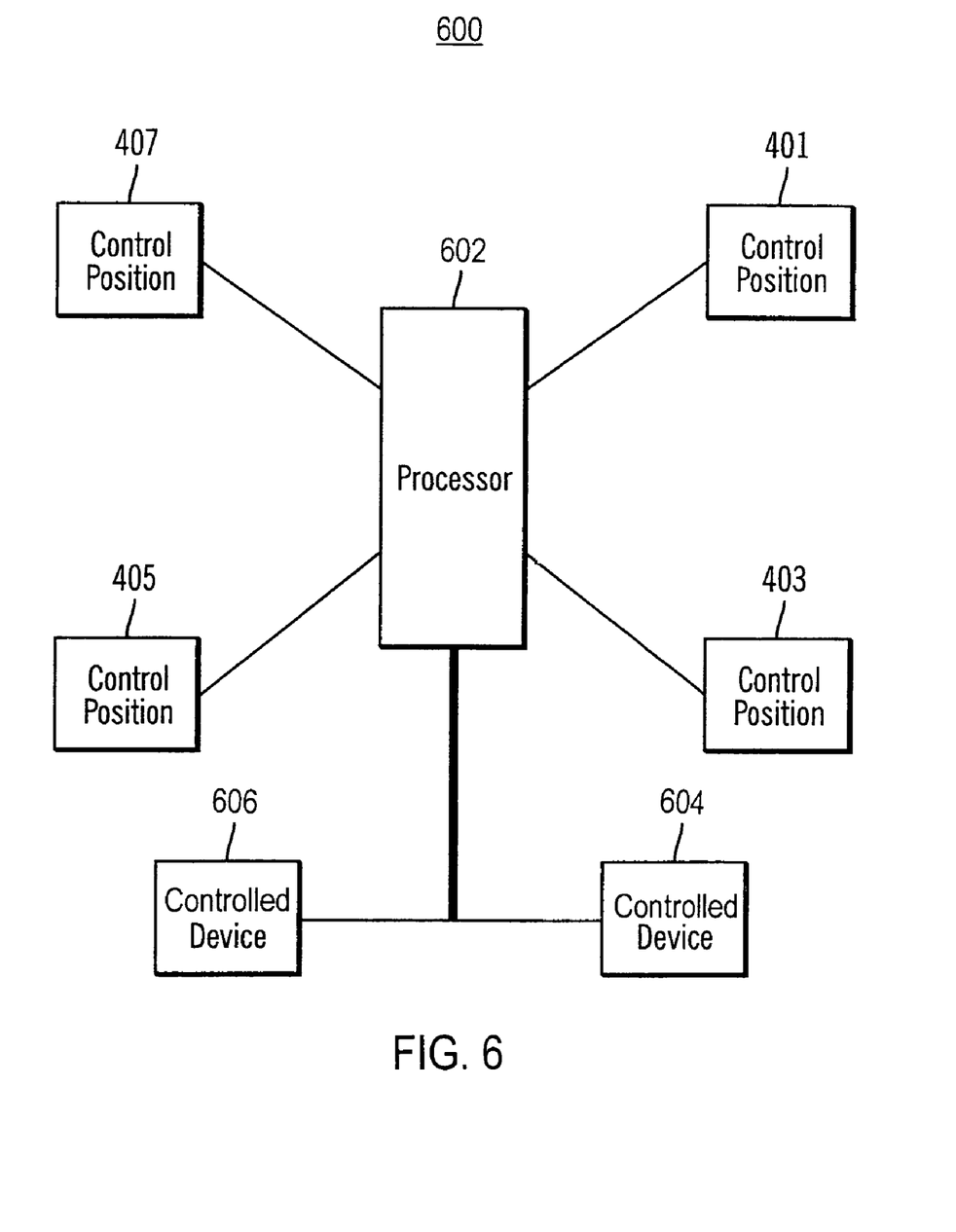
FIG. 6 is a block diagram illustrating an exemplary control system having a star interconnection arrangement of self-defining controls in accordance with an embodiment of the present invention.

Referring to FIGS. 4, 5 and 6, each control position 401, 403, 405 and 407 has a switch, such as rocker switch 404, comprising a switch base 504 within which at least one receiver 503, 505 is embedded. A switch cover 502 comprising actuators 506, 508, and containing unique identification numbers (not shown) sits on top of the switch base 504 and can be inserted at any control position 401, 403, 405, 407. Additionally, a single wire or a set of wires leads from the switch base 504 to the main processor 602 that controls the desired device 604, 606. No switch cover 502 is assigned to a specific position. All switch covers are interchangeable and able to function from any control position. Each switch cover 502 is encoded with at least one unique identification number as taught in U.S. Pat. No. 6,891,528, "Interchangeable Keyboard with Self Defining Keys". The ID number is implemented by mechanical actuators 506, 508 such as an array of metal pins. In one embodiment of the present invention, the receiver 503, 505 is able to pass along to a main processor 602 (FIG. 6) the identity of the switch that has been activated based upon information stored on the bottom of the switch cover 502.

Figure 7:
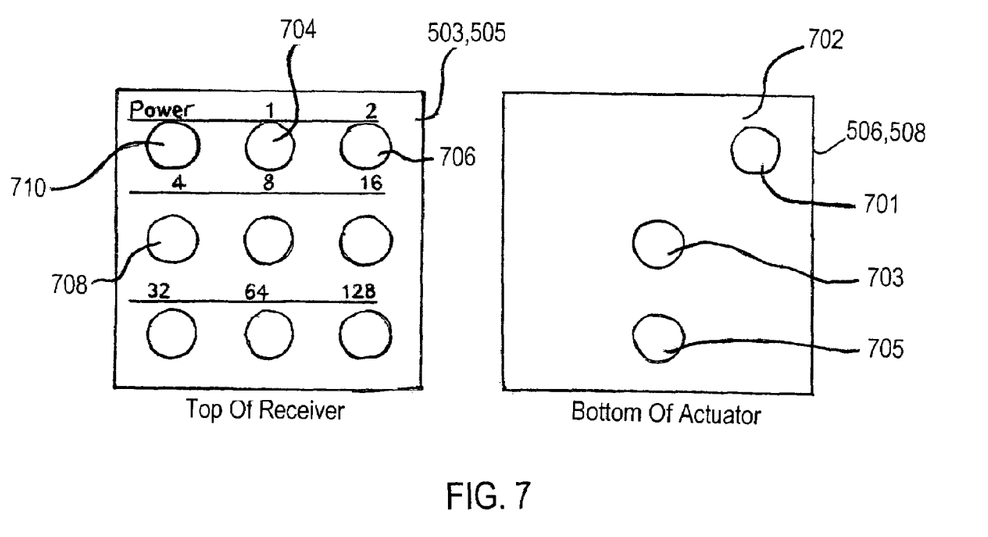
FIG. 7 is a more detailed diagram of a receiver and an actuator of an exemplary self-defining switch in accordance with an embodiment of the present invention.

Turning now to FIG. 7, the receiver 503, 505 on the switch base 504 (not shown in FIG. 7) is configured to receive a low voltage. FIG. 7 shows a bottom view of the actuator 506, 508. The actuator 506, 508 resides in the switch cover 502 and includes an away 702 for housing up to nine metal pins 701, 703, 705. It should be noted that the array 702 is not limited to holding nine pins. Each receiver 503, 505 includes corresponding receptors 704, 706, 708, 710 to accept the metal pins 701, 703, 705 of the array 702. When the switch is activated, the pins 701, 703, 705 of the actuator 506, 508 make contact with the receiver 503, 505. Upon contact, power is provided through the appropriate pin 701 and distributed to any other pins 703, 705 present in the array 702. It should be noted that any of the pins 701, 703, 705 can be designated the "power pin". The receiver 503, 505 searches for any signal from any pin. In the example shown in FIG. 7, the receiver 503, 505 identifies connections at two pins 703, 705. By assigning a bit-position value to each pin, the receiver 503, 505 then sends the total value (the ID—which assumes that all other bits are zero) to the processor 602. An alternative embodiment uses RFID or an equivalent technology to electronically pass along the information upon contact between the actuator 506, 508 and the receiver 503, 505.

Figure 8:
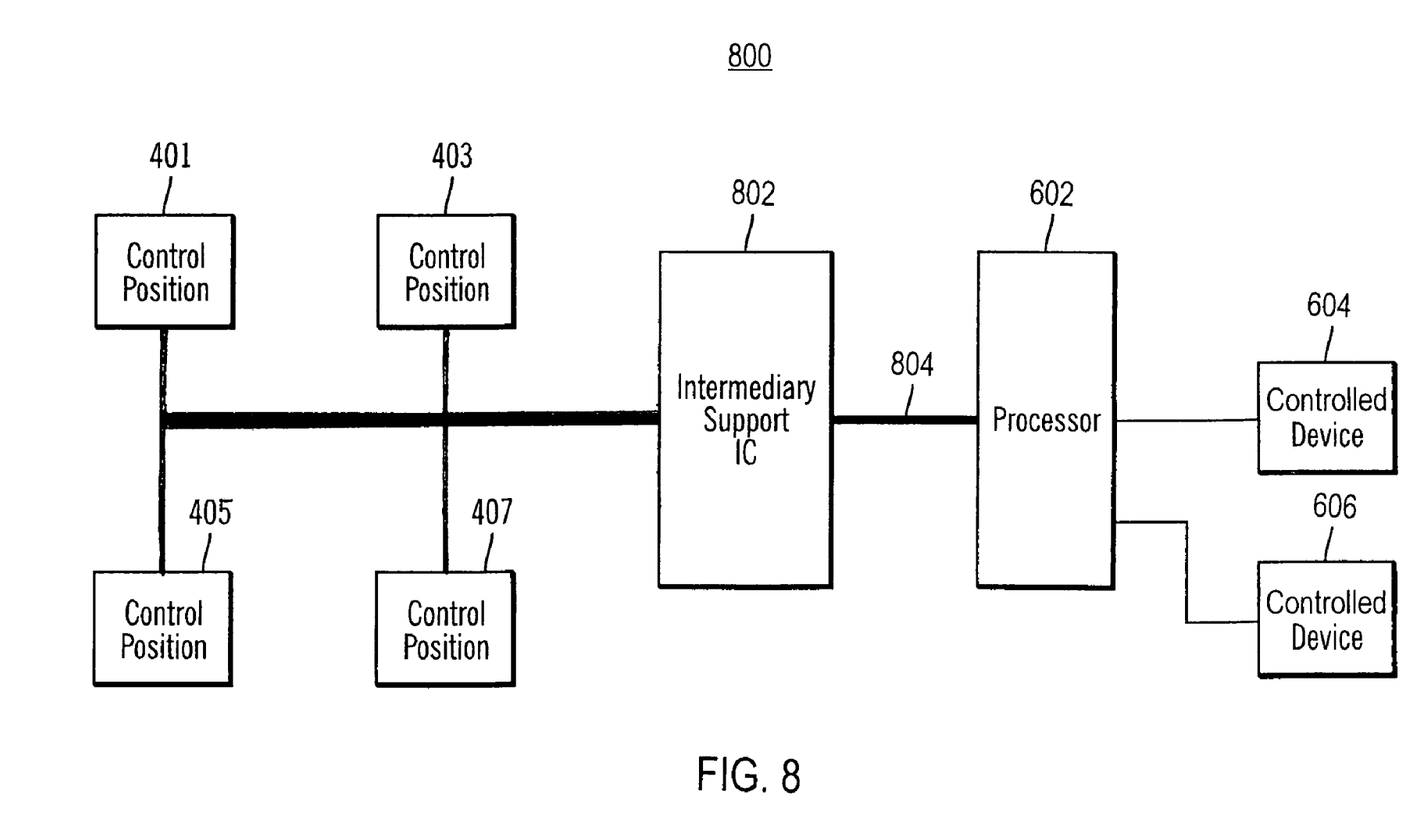
FIG. 8 is a block diagram illustrating an exemplary system having a bus arrangement of self-defining controls in accordance with an embodiment of the present invention.

Alternatively, as shown in FIG. 8, each control position 401, 403, 405, 407 is connected to an intermediate support IC 802 which is located in a position that is physically near the control panel 400. The intermediate support IC 802 controls the flow of information between each control position 401, 403, 405, 407 and the main processor 602. For example, when a control is engaged, the ID number is transferred by the intermediate support IC 802 to the main processor 602 by way of a single bus 804. The processor 602 then operates the desired controlled device 504, 506. It can be appreciated by those of ordinary skill in the art in view of the present discussion that, according to an alternative embodiment, a bus architecture could be created in a daisy chain fashion from control position to control position extending a bus across a plurality of control positions 401, 403, 405, 407, and an interface of the processor 602. In this way, the length of the interconnection between multiple control positions 401, 403, 405, 407, and the processor 602, can be reduced substantially to the length of the bus, thereby reducing the amount of interconnecting wiring used for such an implementation of a system. Additionally, as can be appreciated by those of ordinary skill in the art in view of the present discussion, according to an alternative embodiment, a ring network architecture could be created using a daisy chain interconnecting control position to control position across a plurality of control positions 401, 403, 405, 407, and with an interface of the processor 602, in a circular or ring interconnection arrangement. In this way, the reliability of interconnection between multiple control positions 401, 403, 405, 407, and the processor 602, can be increased by allowing any one point in the ring network to be cut (or disconnected) while maintaining continued reliable communication of signals via the remaining interconnected wiring used for such a ring network architecture in a system implementation.

Figure 9:
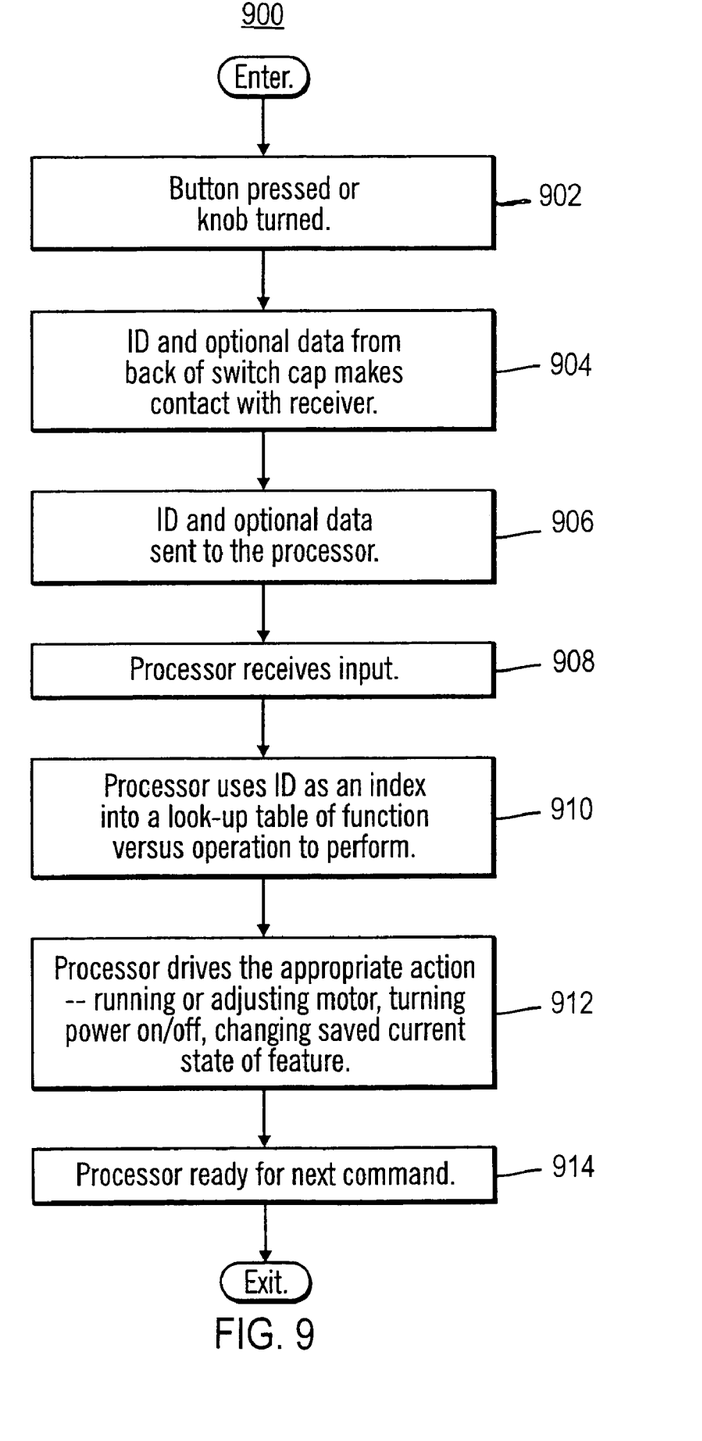
FIG. 9 is an operational flow diagram illustrating exemplary operational sequences for the system of FIG. 1, according to an embodiment of the present invention.

An exemplary method for using the self-defining controls of the present invention is depicted in FIG. 9. Beginning in step 902, the process is started when the user engages a control device such as pressing a button or turning a knob. The ID number for the appropriate function is hard-coded into the switch cover either by a mechanical pin array or an electronic logic device. The ID number and any optional data from the back of the switch cap make contact with a receiver located on the switch base, at step 904. Next, at step 906, the ID and optional data are sent to the main processor 602. The processor 602 receives this information, at step 908, and uses the ID as an index into a look-up table of function versus operation to perform at step 910. The processor 602 drives the appropriate action (e.g. running or adjusting motor, turning power on or off, and changing the saved current state of the feature), at step 912, and is ready for the next command, at step 914.

Figure 10:
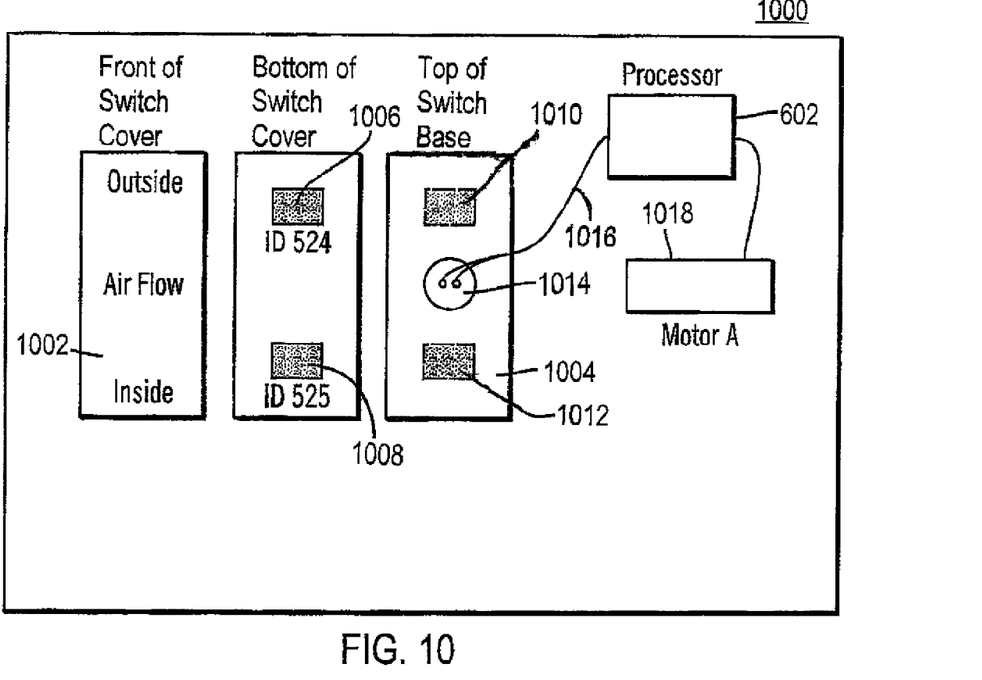
FIG. 10 is a more detailed diagram of an exemplary self-defining rocker switch in accordance with an embodiment of the present invention.

An exemplary embodiment of a rocker switch is illustrated in FIG. 10. The rocker switch 1000 contains a switch cover 1002 which sits upon a switch base 1004. The top side of the switch base 1004 contains two receivers 1010, 1012 which are aligned with actuators 1006, 1008 embedded in the switch cover 1002. When the rocker button is pushed, one of the actuators 1006, 1008 comes into contact with a receiver 1010, 1012 on the switch base 1004. The ID number for the function of each switch position is encoded into the actuator 1006, 1008 by an array of metal pins. The back side of the switch base 1004 contains a plug 1014 which connects the switch receivers 1010, 1012 to the main processor 602 via a pair of wires 1016. For the example of FIG. 10, one rocker position indicates that the operator would like air recirculated, while the other brings in fresh air. So, if the operator decides he/she needs to have fresh air, he/she pushes the rocker switch to the "inside" (down) position, which causes the bottom actuator 1008 to activate the lower receiver 1012. The lower actuator 1008 contains pins corresponding to an exemplary ID number of 525. The lower receiver 1012 determines that ID 525 has been activated and then transmits this information to the main processor 602 over the pair of wires 1016. When the processor 602 receives ID 525, it uses a look-up table to identify the function, determines the current state of the feature (i.e. there is no need to tell the motor to use recirculated air if it is already set in the proper direction), and then takes the appropriate action by engaging the corresponding motor 1018 or other device as may be used in different applications. The switch cover 1002 can either spring back to break the connection or the receiver alternatively can be designed to only send the signal once on contact in order to avoid a constant flow of redundant information from the switch cover 1002 to the processor 602. Other types of switch and processor arrangements to accomplish the desired results as described above can be appreciated by those having ordinary skill in the art in view of the present discussion.

Figure 11:
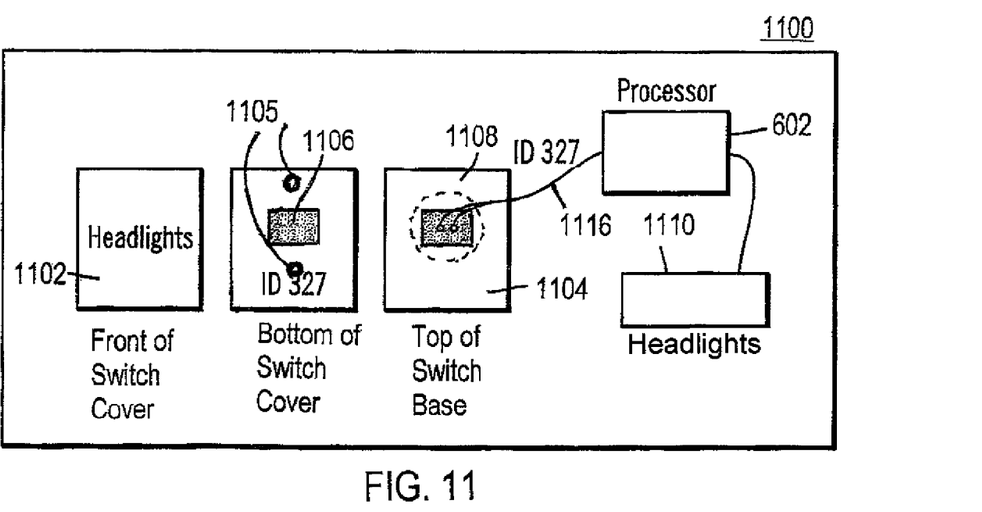
FIG. 11 is a more detailed diagram of an exemplary self-defining push button in accordance with an embodiment of the present invention.

An exemplary embodiment of a push button switch 1100 is illustrated in FIG. 11. As with the rocker switch 1000, the push button 1100 consists of a switch cover 1102 which sits atop a switch base 1104, upon a pair of springs 1105. The top side of the switch base 1104 contains a receiver 1108 which is aligned with an actuator 1106 embedded in the switch cover 1102. When the button 1100 is pushed, the actuator 1106 comes into contact with the receiver 1108 on the switch base 1104. The springs 1105 prevent the actuator 1106 from accidentally and unintentionally contacting the receiver 1108. The actuator 1106 contains a unique ID mapped to the intended function. The back side of the switch base 1104 connects the switch receiver 1108 to the main processor 602 via a pair of wires 1116. As in the case of most push buttons, each feature of the equipment controlled by a push button has a default state that is set in the processor 602 when the equipment or device is initialized (e.g., in the case of a car, the state of headlights 1110 may be initialized when the key is inserted, the ignition is started, or the light switch is turned on). The receiver 1108 sends the ID number to the processor 602 which changes the state of the identified feature. In the example of FIG. 11, the push button 1100 controls the headlights 1110, therefore, when it is pushed, the headlights turn on if they were previously off, and vice versa. Additionally, it is within the scope of this invention to have a plurality of buttons, forming a self-defined control module, that plugs into only one slot, such as, of the control panel 400, and connects to the main processor 602 via the single pair of wires 1116 (e.g., a module having four push buttons to indicate directions up, down, left and right).

Figure 12:
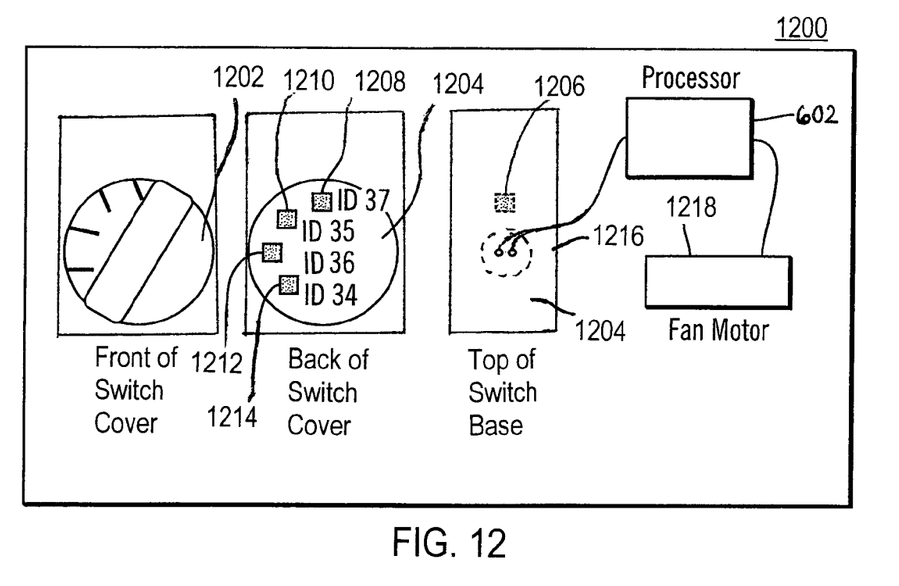
FIG. 12 is a more detailed diagram of an exemplary self-defining knob switch in accordance with an embodiment of the present invention.

An exemplary embodiment of a knob 1200 which has defined settings, such as the control switch for fan speed, is shown in FIG. 12. Like the rocker switch 1000 and the push button 1100, the knob 1200 consists of a switch cover 1202 positioned above a switch base 1204. The switch cover 1202 contains a set of actuators 1208, 1210, 1212, 1214 that makes contact with at least one receiver 1206 embedded within the switch base 1204. Each actuator 1208, 1210, 1212, and 1214 is associated with a unique ID mapped to the intended function for the specific setting of the knob 1200. In other words, in this exemplary embodiment, the actuators 1208, 1210, 1212, and 1214 within the switch cover 1204 contain several different ids representing the various fan speeds and/or functions. Alternatively, each actuator 1208, 1210, 1212, and 1214 has a defined ID with a separate data field attached to define the specific setting. The back side of the switch base 1204 contains a plug which connects one of the switch receivers 1206 to the main processor 602 via a pair of wires. When the knob 1200 is turned the actuator 1208, 1210, 1212, 1214 makes contact with one of the receivers 1206 and the ID and optionally associated data, which is stored in logic contained in the knob cover 1202, are sent to the processor 602. The processor 602 then directs the fan motor 1218 to be set to the appropriate speed or other intended function.

Other embodiments of the present invention allow the switch covers for the various types of switches, e.g. rocker, push button, knob, and the like, to be coupled to any particular receiver. For example, each receiver can be coupled to a rocker, push button, or knob switch cover. The switch function and type can be identified, in one embodiment, by a unique pin configuration on the switch cover. In another embodiment, the switch cover, receiver, and switch base are a self-contained unit, thereby allowing the entire unit to be "plugged" into a switch receptacle. This allows for the positions of different types of switches to be configurable. Additionally, the switch identity mechanism is not limited to an identification means on an actuator.

For example, the switch, in one embodiment, is configured so that as soon as the switch is "plugged in" to a receptacle, the identity of the switch can be determined by the main processor 602. For example, the identifying pins can be monitored by the main processor 602 independently of the function of the actuator. The pins would contact corresponding receptors in the receiver and this could be monitored by the main processor 602. The main processor 602 can also separately monitor the actuator function of the switch. This way the identity of the switch can be determined by the main processor 602 at any time independent of the switch function. As a second example, a non-volatile memory device such as a read-only memory device can be associated with a particular switch cover. The switch cover coupled to a switch receiver would be plugged into a receptacle. The main processor 602 could monitor the identity of the switch, via the connection at the receptacle, from the read-only memory at any time independently of a switch function for that particular switch. In an embodiment where the main processor 602 reads identification information, the reading can be done by receiving a signal from identifying pins or from a non-volatile memory.

The concept of the present invention may be used for a wide variety of products and devices other than the automotive industry. In trying to apply these ideas in a way that justify the cost of the modifications for the automotive industry beyond the needs of the disabled, this technology can be used for the benefit of everyone. Many different applications of the teachings presented herein should be obvious to those of ordinary skill in the art in view of the present discussion.

For example, in New York it is a requirement that operators turn on their headlights when the windshield wipers are turned on. If the processor in the automobile detects a switch that is encoded with a "New York" switch cap, the processor could automatically turn on the headlights when the wipers are turned on. The function can be table driven. No additional wiring or devices are required other than a switch cap that identifies the special function. This is something that the automobile manufacturer could charge extra for, and could easily be installed later if someone moves to New York. The consumer would go to the dealer and purchase the option which can be installed in seconds by just replacing the cap. This installation could optionally be done by the user, without requiring expert technical assistance from an automotive technician.

Additionally, in today's manufacturing processes, the cost of making differentiated items is extremely high. It can in fact be cheaper to just install many of the features on every item than to differentiate the assembly process. This was reportedly done with VCRs in the late 80's and early 90's, when virtually every VCR was identical, but certain buttons were only exposed on certain models. The idea of hiding at least some features in this way may be very attractive to the industry, and would allow the vehicle or other product or device to be customized easily, such as at the point of sale, to suit the needs and preferences of the consumer and the user.

Non Limiting Hardware and Software Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer system to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for associating a user control in a user interface with a function of a controllable device, the method comprising:
   physically placing, by an individual user, a self-defining user control at a first predefined location of a plurality of predefined locations of a user interface, the self-defining user control including identification information that is readable by a controller for a controllable device, wherein the self-defining user control is designed to be physically locatable and re-locatable by individual users at any of the plurality of predefined locations;
   determining, by the controller, the identification information from the self-defining user control at the first predefined location; and
   in response to determining the identification information, the controller associating the self-defining user control at the first predefined location with a predefined function for the controllable device.

2. The method of claim 1, further comprising:
   detecting a user input signal via the self-defining user control at the first predefined location; and
   in response to the detecting, activating the predefined function for the controllable device.

3. The method of claim 1, wherein the self-defining user control comprises at least one of:
   a button;
   a switch;
   a knob; and
   a control module that includes at least one of a button, a switch, and a knob.

4. The method of claim 1, wherein the determining, by the controller, the identification information from the self-defining user control comprises determining the identification information separately from monitoring a control function of the self-defining user control associated with the controllable device.

5. The method of claim 1, wherein the determining, by the controller, the identification information from the self-defining user control comprises determining the identification information as part of monitoring a control function of the self-defining user control associated with the controllable device.

6. The method of claim 1, wherein the self-defining user control comprises a switch cover and a switch receiver, wherein the determining the identification information of the self-defining user control comprises reading a switch identification device associated with the switch cover.

7. A system for associating a user control in a user interface with a function of a controllable device, the system comprising:
   a user interface having a plurality of predefined locations;
   a self-defining user control designed to be physically locatable and re-locatable by a user at any of the plurality of predefined locations;
   while physically located at a first predefined location of the plurality of predefined locations of the user interface, the self-defining user control outputting control function information in response to interaction with a user, the self-defining user control also outputting identification information that associates the self-defining user control with a predefined function for a controllable device;
   a first interconnect, communicatively coupled with the self-defining user control at the first predefined location; and
   a controller, communicatively coupled with the first interconnect and the self-defining user control at the first pre-defined location, the controller for determining an identification information from the self-defining user control, and, in response thereto, the controller associating the self-defining user control with a predefined function for a controllable device only while the self-defining user control remains physically located at the first predefined location of the user interface.

8. The system of claim 7, further comprising:
   a plurality of interconnects, each interconnect at one of a plurality of separate predefined locations of the user interface, each interconnect being communicatively coupled with the controller, such that when the self-defining user control is at the first predefined location of the user interface, the self-defining user control is communicatively coupled with the first interconnect, and such that when the self-defining user control is at a second predefined location of the user interface, the self-defining user control is communicatively coupled with a second interconnect, wherein while the self-defining user control is located at one of the plurality of predefined locations, the self-defining user control is communicatively coupled with the controller for the controller reading the identification information from the self-defining user control, and, in response to the identification information, the controller associates the self-defining user control at the one of the plurality of predefined locations with the predefined function for the controllable device.

9. The system of claim 8, wherein the plurality of interconnects are communicatively coupled with the controller via one of a star electrical network arrangement, a ring electrical network arrangement, and a bus electrical network arrangement.

10. The system of claim 7, wherein controller determines the identification information from the self-defining user control separately from monitoring the control function information from the self-defining user control.

11. The system of claim 7, wherein controller determines the identification information from the self-defining user control as part of monitoring the control function information from the self-defining user control.

12. The system of claim 7, wherein the self-defining user control comprises a switch cover and a switch receiver, wherein controller determines the identification information of the self-defining user control by reading a switch identification device associated with the switch cover.

13. An apparatus for controlling a controllable device, comprising:
a self-defining user control;
a controller for determining identification information from the self-defining user control;
an electrical interconnect;
an electrical circuit for providing an identification information via the electrical interconnect to the controller, the identification information associating the self-defining user control with a predefined function for a controllable device a user interface having a plurality of pre-defined locations; and a modular mechanical interconnect for mechanically locating the self-defining user control in any one of the plurality of pre-defined locations of the user interface, wherein the electrical interconnect is capable of mechanically mating with a separate electrical interconnect located at the any one of the plurality of pre-defined locations in the user interface, and wherein the controller is capable of determining the identification information from the self-defining user control via the electrical interconnect mechanically mated with the separate electrical interconnect located at the any one of the plurality of pre-defined locations in the user interface, thereby the controller being capable of determining the identification information for associating the self-defining user control with a predefined function for the controllable device controlled by the controller.

14. The apparatus of claim 13, wherein controller determines the identification information from the self-defining user control separately from monitoring a control function of the self-defining user control associated with the controllable device.

15. The apparatus of claim 13, wherein controller determines the identification information from the self-defining user control as part of monitoring a control function of the self-defining user control associated with the controllable device.

16. The apparatus of claim 13, wherein the self-defining user control further comprises a switch cover and a switch receiver, wherein controller determines the identification information of the self-defining user control by reading a switch identification device associated with the switch cover.

17. The apparatus of claim 16, wherein the switch identification device is at least one of:
a set of pins mechanically coupled to the switch cover; and
a non-volatile memory.

18. The apparatus of claim 16, wherein the switch receiver comprises a set of receptors for receiving the switch identification device associated with the switch cover.

* * * * *